United States Patent [19]

Ohtsuki et al.

[11] Patent Number: 5,793,540
[45] Date of Patent: Aug. 11, 1998

[54] LENS FIXING STRUCTURE

[75] Inventors: Motohiko Ohtsuki; Kimihiro Kikuchi, both of Miyagi-ken, Japan

[73] Assignee: Alps Electric Co., Ltd., Tokyo, Japan

[21] Appl. No.: 728,412

[22] Filed: Oct. 8, 1996

[30] Foreign Application Priority Data

Oct. 17, 1995 [JP] Japan ..................... 7-268740

[51] Int. Cl.[6] ............................................. G02B 7/02
[52] U.S. Cl. ............................... 359/819; 359/811
[58] Field of Search ............................ 359/811, 813, 359/819, 822

[56] References Cited

U.S. PATENT DOCUMENTS 5,499,143  3/1996  Sakamoto et al. .................. 359/822
5,589,990  12/1996  Kato et al. ......................... 359/819

FOREIGN PATENT DOCUMENTS 2-139506  5/1990  Japan.

Primary Examiner—Loha Ben
Attorney, Agent, or Firm—Brinks Hofer Gilson & Lione

[57] ABSTRACT

A lens fixing structure obviates the need for using a U-shaped lens holder retaining member which is apt to cause incomplete laser welding and which adds to cost. According to the lens fixing structure, a lens is fixed as follows: firstly, only a lens holder is held by a retainer to position it in directions x, y, and z while it is being suspended with respect to a base; secondly, a pair of lens holder retaining members composed of magnet are attracted to the lens holder while they are placed on the base by another retainer or by hands; thirdly, another retainer or other retaining element is removed from the lens holder retaining members; and lastly, the lens holder retaining members and the base are fixed at predetermined points by laser welding and the lens holder retaining members and the lens holder are also fixed at other predetermined points by laser welding.

4 Claims, 4 Drawing Sheets

1

LENS FIXING STRUCTURE

BACKGROUND OF THE INVENTION

1. Field of the Invention

The present invention relates to a lens fixing structure for positioning a lens in directions x, y, and z and fixing it and, more particularly, to a lens fixing structure ideally suited for an optical module for connecting a light emitting element and an optical fiber or for connecting optical fibers.

2. Description of the Related Art

FIG. 6 shows a conventional lens fixing structure which is illustrated, for example, in FIG. 8 of Japanese Unexamined Patent Publication No. 2-139506. A lens 1 is supported by a lens holder 2, the lens holder 2 is retained by a lens holder retaining member 3, and the lens holder retaining member 3 is supported on a base 4. The lens holder retaining member 3 is composed of a U-shaped component (x–z surface in the drawing) which has a pair of side walls 3a and 3b, and a bottom wall 3c; it can be moved on the x–y surface of the base 4. The lens holder 2 can be moved in a direction z (and a direction y) in relation to the lens holder retaining member 3.

In such a structure, to position the lens 1 in the directions x, y, and z and to fix it, the lens holder retaining member 3 is moved on the surface of the base 4 together with the lens holder 2 to position it in the directions x and y, then the lens holder 2 is moved in the direction z in relation to the lens holder retaining member 3 and it is fixed. After the completion of the positioning in the directions x, y, and z, the lens holder retaining member 3 and the base 4 are fixed by laser welding at corner points 5 between the side walls 3a, 3b and the bottom wall 3c. The lens holder 2 and the lens holder retaining member 3 are also fixed by laser welding at points 6.

In the conventional lens fixing structure described above, the lens holder retaining member 3 must be formed into the U shape; when bending a metal plate, however, as illustrated in FIG. 7, the corner 5 formed by the side walls 3a, 3b and the bottom wall 3c cannot be bent at right angles. This poses a problem in that laser beams cannot adequately reach the corner fixing points during laser welding, resulting in incomplete fixing to the base 4. Further, since the lens holder 2 and the lens holder retaining member 3 can be relatively moved, the gap between them is required to be controlled with high accuracy, e.g. within 50 μm, thus adding to cost.

SUMMARY OF THE INVENTION

The present invention has been made with a view toward solving the problems with the prior art and it is an object of the present invention to provide a lens fixing structure which enables a lens to be positioned in directions x, y, and z and fixed by an inexpensive configuration.

To this end, according to the present invention, there is provided a lens fixing structure equipped with: a base; a pair of lens holder retaining members fixed to the base; a lens holder fixed to the lens holder retaining members in a state where it is suspended with respect to the base; and a lens retained by the lens holder; wherein either the lens holder or the lens holder retaining members are formed using a magnetic material and the other is formed using magnet, and the lens holder and the lens holder retaining members are fixed by laser welding.

According to the lens fixing structure configured as described above, the magnetic attraction between the lens holder and the pair of lens holder retaining members allows the lens holder to be positioned while it is suspended with respect to the base. This makes it possible to obviate the need of shaping the lens holder retaining members into the complicated U shape; instead, the lens holder retaining members can be formed into simple blocks. Furthermore, since laser welding is carried out with the lens holder and the lens holder retaining members magnetically attracted to each other, only the lens holder has to be retained by a retainer; even when another retainer or other retaining means which holds the lens holder retaining members is removed, there should be no dislocation occurring between the lens holder and the lens holder retaining members. Therefore, laser welding can be carried out easily in the absence of another retainer or other retaining means.

Preferably, the lens holder retaining members are made of magnet and the lens and the base are both made of a magnetic material in the configuration described above. Thus, laser welding can be performed with the lens holder retaining members and the base magnetically attracted to each other as well as the lens holder and the lens holder retaining members magnetically attracted to each other. This prevents dislocation from taking place between the lens holder and the lens holder retaining members, or between the lens holder retaining members and the base.

Further preferably in the configuration described above, the magnet is iron/cobalt/chromium-based or iron/manganese/oxygen-based. Such magnets do not contain ingredients which easily dissolve as in the case of a generally known carbon-based magnet; therefore, they exhibit good weldability in laser welding.

DESCRIPTION OF THE PREFERRED EMBODIMENT

Figure 1:
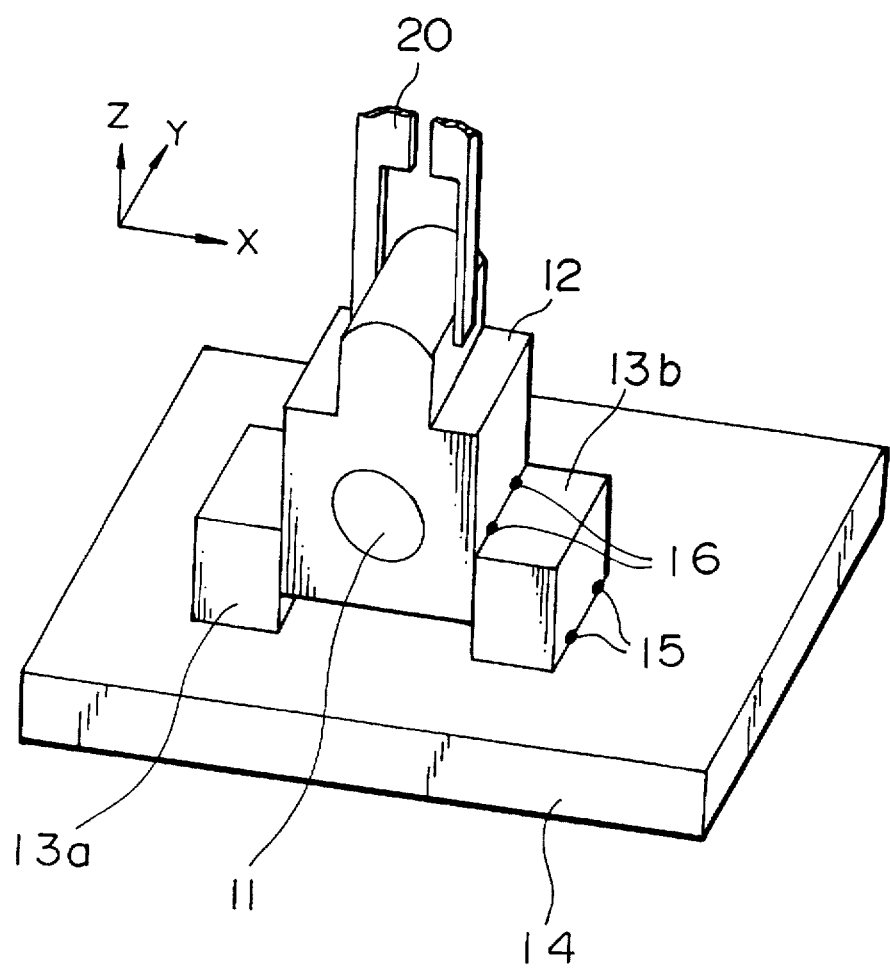
FIG. 1 is a block diagram showing a lens fixing structure according to an embodiment of the present invention.

An embodiment of the present invention will now be described with reference to the accompanying drawings. FIG. 1 is a block diagram showing an embodiment of a lens fixing structure in accordance with the present invention; and FIG. 2 through FIG. 5 are explanatory diagrams illustrative of assembly process steps of the lens fixing structure shown in FIG. 1.

The lens fixing structure shown in FIG. 1 is constructed by a lens holder 12 which supports a lens 11 (the optical axis is in the direction y), a pair of lens holder retaining members 13a, 13b which support the lens holder 12 in the direction x, and a base 14 which retains the lens holder retaining members 13a, 13b on an x-y surface. The lens holder 12 can be moved in the directions x, y, and z by a retainer 20 such as a manipulator. The lens holder 12 is made of a corrosionresistant, magnetic metal such as ferrite-based or martensite-based stainless steel. The lens holder retaining members 13a, 13b are made of an iron/cobalt /chromium-based or iron/manganese/oxygen-based magnet. The base 14 is made of a nonmagnetic material.

The lens holder retaining members 13a, 13b can be manufactured inexpensively by stamping out a belt-shaped metal plate by a press, deburring the stamped pieces by barrel finishing to form it into a hexahedron or block shape, washing them, then magnetizing them.

Figure 2:
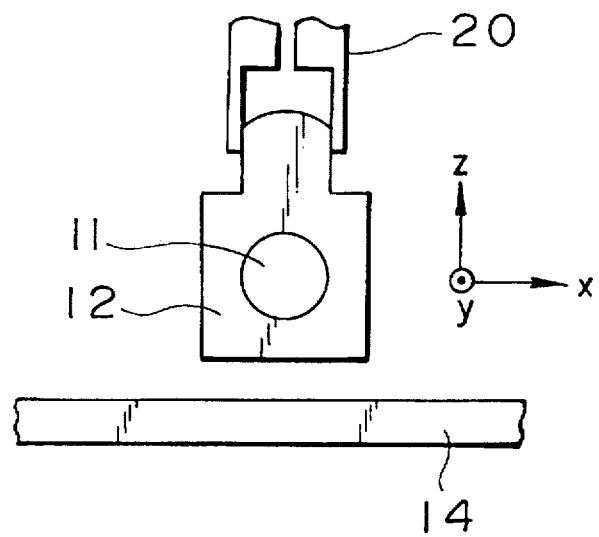
FIG. 2 is an explanatory diagram showing an assembly process of the lens fixing structure shown in FIG. 1.
Figure 3:
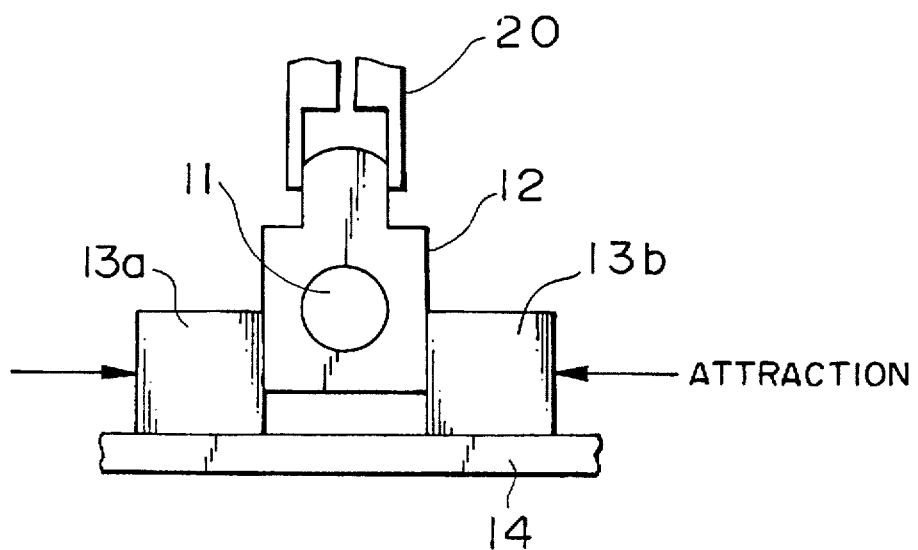
FIG. 3 is another explanatory diagram showing an assembly process of the lens fixing structure shown in FIG. 1.
Figure 4:
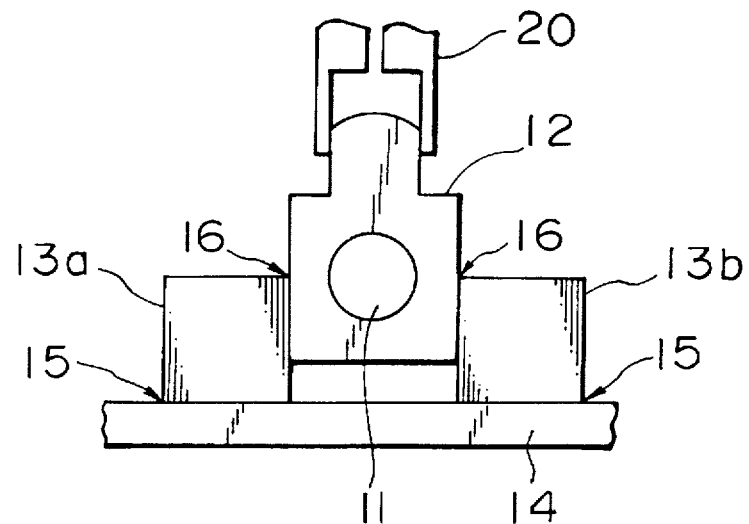
FIG. 4 is still another explanatory diagram showing an assembly process of the lens fixing structure shown in FIG. 1.
Figure 5:
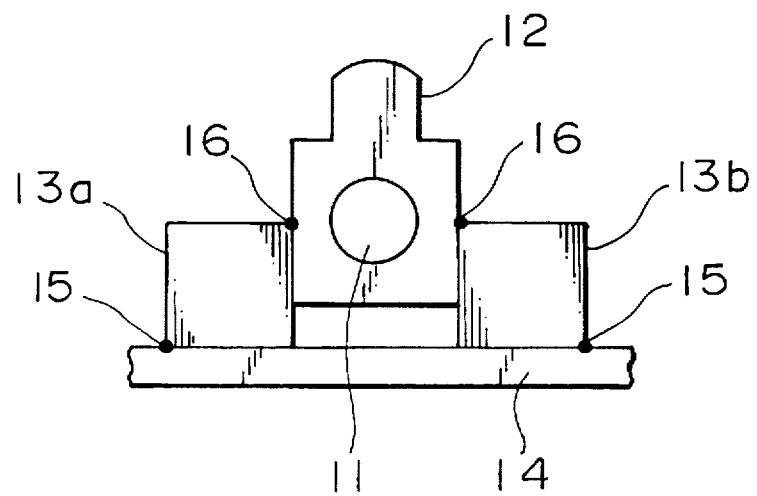
FIG. 5 is yet another explanatory diagram showing an assembly process of the lens fixing structure shown in FIG. 1.
Figure 6:
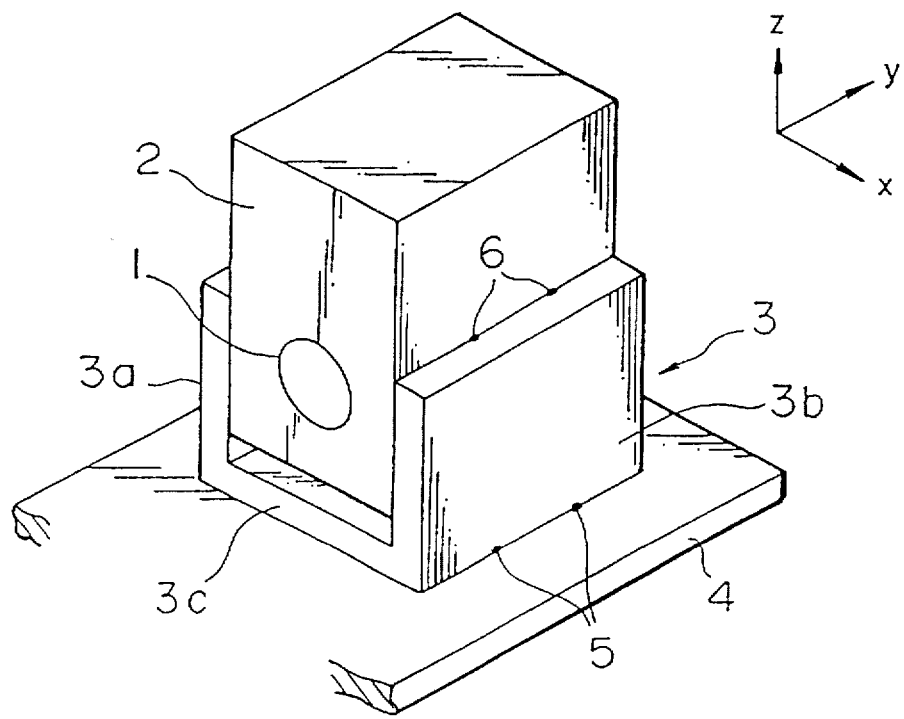
FIG. 6 is a block diagram showing a conventional lens fixing structure.
Figure 7:
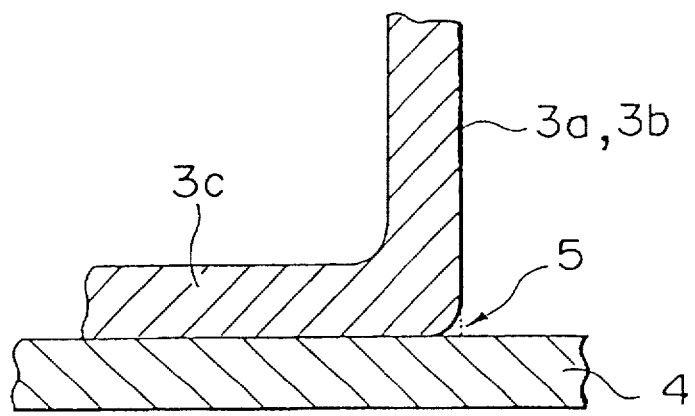
FIG. 7 is an explanatory diagram illustrating a corner section of a lens holder retaining member shown in FIG. 6.

Referring now to FIG. 2 through FIG. 5, the assembly process will be described. Firstly, as illustrated in FIG. 2, only the lens holder 12 is held by the retainer 20 to position it in the directions x, y, and z while it is being suspended with respect to the base 14. Then, as illustrated in FIG. 3, the lens holder retaining members 13a, 13b are attracted to the lens holder 12 while they are placed on the base 14 by another retainer or by hands. In the following step, as illustrated in FIG. 4, another retainer or other retaining means is removed from the lens holder retaining members 13a, 13b, then the lens holder retaining members 13a, 13b and the base 14 are fixed at points 15 and also the lens holder retaining members 13a, 13b and the lens holder 12 are fixed at points 16 by laser welding. Lastly, as illustrated in FIG. 5, the retainer 20 is removed from the lens holder 12.

Thus, according to the embodiment described above, the lens holder retaining members 13a, 13b are not bent; therefore, the laser welding points 15 can be provided with squareness by the inexpensive manufacturing process and the lens holder retaining members 13a, 13b and the base 14 can be securely fixed by laser welding. Furthermore, since the lens holder retaining members 13a, 13b are composed of magnet, another retainer holding the lens holder retaining members 13a, 13b can be removed before laser welding; therefore, the retainer does not interfere with laser welding.

In the above embodiment, the base 14 is composed of a nonmagnetic material; however, it may be composed of a magnetic material. In this case, the assembly process will be as follows: referring to FIG. 2 through FIG. 5, in the first step, only the lens holder 12 is held by the retainer 20 and positioned in the directions x, y, and z while it is being suspended in relation to the base 14 as illustrated in FIG. 2. In the second step, the lens holder retaining members 13a, 13b are attracted to both the lens holder 12 and the base 14 by another retainer or by hands as shown in FIG. 3. In the third step, as illustrated in FIG. 4, another retainer or other retaining means is removed from the lens holder retaining members 13a, 13b, then the lens holder retaining members 13a, 13b and the base 14 are fixed at the points 15 and the lens holder retaining members 13a, 13b and the lens holder 12 are fixed at the points 16 by laser welding. Lastly, the retainer 20 is removed from the lens holder 12 as illustrated in FIG. 5.

In the above embodiment, the lens holder 12 is positioned in the directions z, y, and z in relation to the base 14, then the lens holder retaining members 13a, 13b are magnetically attracted to the lens holder 12; however, the lens holder 12 and the lens holder retaining members 13a, 13b may be magnetically attracted first before positioning the lens holder 12 in the directions x, y, and z in relation to the base 14. In this case, both the lens holder 12 and the lens holder retaining members 13a, 13b which have been magnetically attracted to each other are held by the retainer 20 to position them in the directions x, y, and z while levitating them with respect to the base 14. Then, the retainer 20 is moved down to move both the lens holder 12 and the lens holder retaining members 13a, 13b in the direction z. After the lens holder retaining members 13a, 13b touch the base 14, the lens holder 12 is further moved in the direction z with respect to the lens holder retaining members 13a, 13b so as to position the lens holder 12 in the directions x, y, and z in relation to the base 14. After that, as in the embodiment described above, the lens holder retaining members 13a, 13b and the lens holder 12, and the lens holder retaining members 13a, 13b and the base 14 are fixed by laser welding.

Thus, according to the present invention, the magnetic attraction between the lens holder and the pair of lens holder retaining members allows the lens holder to be positioned while it is being suspended with respect to the base. This makes it possible to use easy-to-machine, inexpensive lens holder retaining members and therefore to provide an inexpensive lens fixing structure.

Furthermore, since laser welding is carried out with the lens holder and the lens holder retaining members magnetically attracted to each other, only the lens holder has to be retained by a retainer; even when another retainer or other retaining means which holds the lens holder retaining members is removed, there should be no dislocation occurring between the lens holder and the lens holder retaining members. Therefore, laser welding can be carried out easily in the absence of another retainer or other retaining means.

Further, in the above configuration, when the lens holder retaining members are made of magnet and the lens holder and the base are both made of a magnetic material, laser welding can be performed with the lens holder retaining members and the base magnetically attracted to each other as well as the lens holder and the lens holder retaining members magnetically attracted to each other. This prevents dislocation from taking place between the lens holder and the lens holder retaining members, or between the lens holder retaining members and the base.

Furthermore, in the above configuration, when the magnet is iron/cobalt/chromium-based or iron/manganese/oxygen-based, the magnet will exhibit good weldability in laser welding, allowing the lens holder, the lens holder retaining members, and the base to be securely fixed.

What is claimed is:

1. A lens fixing structure comprising:
   a base;
   a pair of lens holder retaining members fixed to said base;
   a lens holder fixed to said lens holder retaining members in a state where it is suspended with respect to said base; and
   a lens retained by said lens holder; wherein
   either said lens holder or said lens holder retaining members are formed using a magnetic material and the other is formed using magnet, and said lens holder and said lens holder retaining members are fixed by laser welding.

2. A lens fixing structure according to claim 1, wherein said lens holder retaining members are formed using magnet and said base is formed using a magnetic material, and these lens holder retaining members and said base are fixed by laser welding.

3. A lens fixing structure according to claim 2, wherein said magnet is one of iron/cobalt/chromium-based and iron/manganese/oxygen-based.

4. A lens fixing structure according to claim 1, wherein said magnet is one of iron/cobalt/chromium-based and iron/manganese/oxygen-based.

* * * * *